No. 709,322. Patented Sept. 16, 1902.
A. E. HENDERSON.
ROLLER BEARING.
(Application filed July 20, 1901.)
(No Model.)
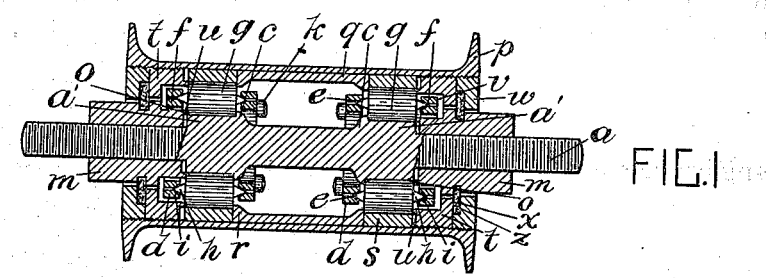
FIG. 1
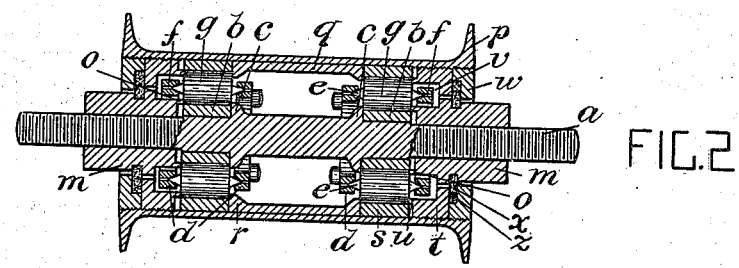
FIG. 2
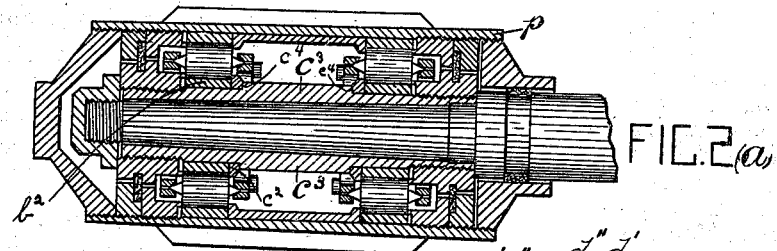
FIG. 2(a)
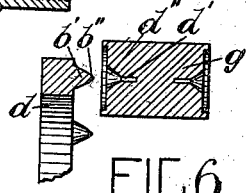
FIG. 6
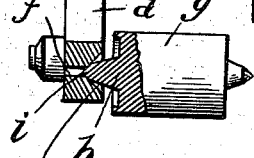
FIG. 7
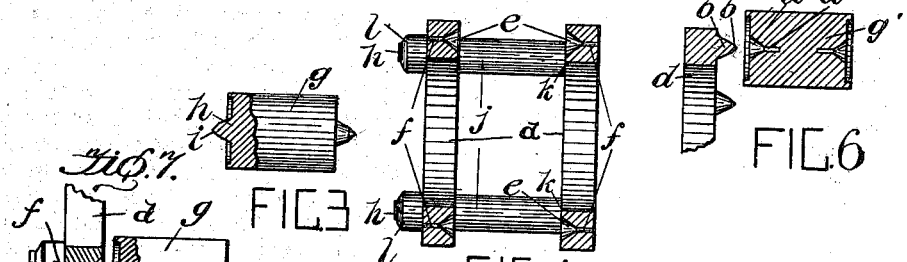
FIG. 3
FIG. 4
FIG. 5
Witnesses
W. S. Gust
J. O'Keefe
Inventor
A. E. Henderson
by C. N. Ricke
his atty.

UNITED STATES PATENT OFFICE.

ALBERT E. HENDERSON, OF TORONTO, CANADA, ASSIGNOR TO THE TORONTO ROLLER BEARING COMPANY, LIMITED, OF TORONTO, CANADA, A CORPORATION OF ONTARIO.

ROLLER-BEARING.

SPECIFICATION forming part of Letters Patent No. 709,322, dated September 16, 1902.

Application filed July 20, 1901. Serial No. 69,151. (No model.)

*To all whom it may concern:*

Be it known that I, ALBERT ENNIS HENDERSON, of the city of Toronto, in the county of York and Province of Ontario, Canada, have invented certain new and useful Improvements in Roller-Bearings; and I hereby declare the following to be a full, clear, and exact description of the same.

This invention relates to an antifriction roller-bearing for rotatable shafts mounted in stationary journal-boxes or for a wheel rotatably mounted upon a stationary shaft or axle; and the object of the invention is to so construct the bearing that there will be practically no friction between the parts when in motion and also to provide a means for adjusting the parts relatively to each other to prevent longitudinal, radial, and lateral displacement; and the invention consists, essentially, of mounting on the axle one or more sets of annular retaining or bearing rings the inner faces of which are provided with conical-shaped recesses terminating in comparatively diminutive openings or bores extending through the ring parallel with the longitudinal axis of the shaft or axle and opposed to the centers of their respective conical recesses, a set of antifriction-rollers for each pair of retaining or bearing rings the ends of which are provided with tapering mandrels terminating in abruptly conical shaped ends contained in the conical-shaped recesses of the retaining-rings, the points of the mandrels being opposed to their respective openings or bores, so that when the mandrels are contained in the recesses the contact will not be upon the extreme point of the mandrels, but as near it as will render the contact substantial, a series of tie-rods for adjustably holding the retaining or bearing rings together to cause a collective revolution of the antifriction-rollers and retaining-rings about the shaft or axle, abutting shoulders on the shaft or axle and in the hub for the inner ends of the sets of antifriction-rollers and adjustable shoulders opposed to the outer ends of the set of antifriction-rollers to prevent the longitudinal movement of the same on the shaft or axle and to form a thrust-bearing upon the ends of the rollers, as hereinafter more fully set forth, and more particularly pointed out in the claims.

In the drawings, Figure 1 is a sectional view of the roller-bearing, showing the relative position of the parts. Figs. 2 and 2ª are sectional views of modifications of the roller-bearing. Fig. 3 is an enlarged view of one of the antifriction-rollers. Fig. 4 is an enlarged sectional view through one of the bearing or retaining rings. Fig. 5 is an enlarged sectional view of the axle and sleeve shown in Fig. 2. Fig. 6 is a sectional view of a modification of the bearing or retaining rings and antifriction-rollers, and Fig. 7 is an enlarged view of one of the antifriction bearing-rollers and a section of the retaining-rings.

Like letters of reference refer to like parts throughout the specification and drawings.

Although the present specification and drawings are restricted to a description and illustration of a roller-bearing for a bicycle or automobile wheel, the same parts and same construction can be adapted to any other style of a wheel, journal-box, or shaft.

In Fig. 2 the axle $a$ is shown to be fitted with sleeves or boxings $b$, prevented from inward displacement by abutting flanges $c$, integrally formed with the axle $a$ at the inner ends of the seats therefor and abutting and projecting slightly beyond the peripheries of the sleeves or boxings $b$. Encircling the axle $a$ are two sets of bearing or retaining rings $d$, in the inner faces of which are formed conical recesses $e$, terminating in horizontally-disposed openings or bores $f$, parallel with the axis of the shaft or axle $a$. Contained between the bearing or retaining rings $d$ are antifriction-rollers $g$, having tapering mandrels $h$, terminating abruptly in the conical-shaped ends $i$. When the antifriction-rollers and the bearing or retaining rings are assembled, the conical-shaped ends $i$ are contained in the recesses $e$, the points of the ends $i$ being opposed to the bores $f$, so that the contact between the ends of the mandrels and the rings will not be upon the points of the mandrels, but as near thereto as will render the contact substantial, and as the recesses $e$ are of much greater diameters than the ends of the mandrels it follows that there will be no contact other than that near the points. Uniting the retaining or bearing rings are tie-rods $j$, having the shoulders $k$, engaging the inner faces of the retaining-rings, and the usual screw-threaded shanks, which pass through the rings and are fitted with nuts $l$, engaging the outer faces of the rings. By means of the tie-rods and the engaging shoulders and nuts the rings are held in such relation to each other that the conical recesses will be in horizontal opposition and the antifriction-rollers will be free from contact with each other and with the tie-rods. The axle $a$ between the sleeves or boxings $b$ and the ends is screw-threaded, and mounted upon the threaded parts are nuts $m$, the inner faces of which are recessed to provide flanges $o$ to contact with the ends of the rollers $g$.

By reference to the drawings it will be noticed that the ends of the rollers $g$ are correspondingly recessed, the object of this construction being to minimize the contacting surfaces thereof with those of the nuts $m$. The abutting flanges $c$, engaging the inner ends, and the nuts $m$, engaging the outer ends of the rollers, hold the rollers in their adjusted position on the sleeves or boxings $b$. Inclosing the rollers $g$ and the retaining-rings $d$ is the shell $p$ of the hub, the inner faces of the ends of which are screw-threaded, and contained in the hub-shell $p$ is a centrally-located lining $q$, having annular abutting flanges $r$, the side faces of which are disposed in substantially the same plane as the side faces of abutting flanges $c$. The flanges and adjusting-nuts operating upon the rollers prevent the longitudinal displacement of the parts. Contained within the hub-shell are antifriction-linings $s$, opposed to the antifriction sleeves or boxings $b$. The antifriction-rollers $g$ engage the sleeves or boxings $b$ and linings $s$ (shown in Figs. 2 and 2$^a$) during the rotation of the wheel or axle and revolve collectively with the bearing or retaining rings about the shaft or axle, each antifriction-roller during such collective revolution revolving individually on its own axis. Contained in the threaded ends of the hub-shell $p$ are annular nuts $t$, the inner faces of which are fitted with annular flanges $u$, bearing against the outer ends of the antifriction-rollers $g$. When assembled in position, the nuts $t$ are alined with the nuts $m$, and formed in the nuts $m$ and $t$ are annular recesses $v$, in which are contained the adjacent rings $d$, there being sufficient clearance between the rings and nuts to prevent any contact between them. Fitted in the ends of the hub or sleeve $p$ are lock-nuts $w$, bearing against the nuts $t$, and formed in the nuts $w$ and $t$ are annular recesses $x$, in which are contained washers $z$. Instead of using the sleeves or boxings $b$ the axle may be fitted with enlargements $a'$, as shown in Fig. 1, with which engage the antifriction-rollers $g$.

In Fig. 6 is shown a modification of the retaining-rings and rollers. In this case the retaining-rings are fitted with tapering mandrels $b'$, having conical-shaped ends $b''$, while in the ends of the rollers $g'$ are formed conical recesses $d''$, terminating in horizontally-disposed bores $d'$.

In Fig. 2$^a$ the axle is shown to be provided with an inclosing sleeve $c^3$, having abutting shoulders $c^4$ to prevent the inward displacement of the annular abutting rings $c^2$, engaging and preventing the inward displacement of the sleeves or boxings $b^2$, which boxings are similar in all respects to the sleeves or boxings $b$.

Having thus fully described my invention, what I claim as new, and desire to secure by Letters Patent, is—

1. An antifriction-bearing, comprising two sets of bearing elements one set of said elements having conical recesses and the other set having projecting tapering mandrels terminating in abruptly-conical points journaled in and of lesser diameters than the conical recesses.

2. In a roller-bearing, the combination of the external sleeve having internal annular flanges, an axle having peripheral flanges, antifriction-rollers contained between the axle and external sleeve, tapering mandrels for the ends of the rollers terminating abruptly in conical ends, bearing-rings loosely encircling the axle having conical recesses of greater diameters than and in which are contained the conical ends of the mandrels, and nuts fitted on the ends of the axle and into the ends of the external sleeve to prevent the outward displacement of the rollers, substantially as set forth.

3. In a roller-bearing, the combination of the external sleeve having internal annular flanges, an axle having peripheral flanges, bearing-rings loosely encircling the axle having conical recesses, bearing-rollers having mandrels terminating abruptly in conical ends journaled in said recesses, said ends being of lesser diameter than the recesses, and nuts fitted on the axle, substantially as set forth.

4. In a roller-bearing, the combination of an external sleeve having internal annular flanges, an internal sleeve having peripheral flanges, antifriction-rollers contained between the internal and external sleeves and prevented from inward displacement by the flanges, bearing-rings loosely encircling the internal sleeve having conical recesses, tapering mandrels for the ends of said rollers having abruptly-terminating conical ends of lesser diameters than the recesses journaled in said recesses, and end nuts to prevent the outward displacement of the rollers.

5. In a roller-bearing, the combination of an external sleeve having internal annular flanges, an internal sleeve mounted on the axle and having peripheral flanges the side faces of the flanges being in the same plane, antifriction-rollers contained between the sleeves prevented from inward displacement by the flanges, bearing-rings loosely encircling the internal sleeve having conical recesses, tapering mandrels for the ends of the rollers terminating in abruptly-conical ends, said ends being journaled in and of lesser diameters than the recesses, and end nuts to prevent the outward displacement of the rollers fitted with inwardly projecting flanges to form contacting surfaces with the ends of the rollers.

6. In a roller-bearing, the combination of an external sleeve having internal annular flanges, an internal sleeve mounted on the axle and having peripheral flanges, antifriction-rollers with recessed ends contained between the internal and external sleeves, bearing-rings loosely encircling the internal sleeve having conical recesses, tapering mandrels for the ends of the rollers terminating in abruptly-conical ends of lesser diameters than the recesses and journaled therein, and nuts fitted with inwardly-projecting flanges to form annular recesses in the inner faces of the nuts and contacting surfaces for the ends of the rollers, substantially as specified.

7. In a roller-bearing, the combination of the bearing-rings, bearing-rollers having recessed ends fitted with mandrels journaled in the retaining-rings, an axle having peripheral abutting shoulders, a hub-shell having internal annular abutting shoulders alining with the annular abutting shoulders of the axle, to prevent the inward displacement of the bearing-rollers, and adjustable nuts fitted on the axle and into the ends of the hub-shell having on their inner faces annular flanges to contact with the bearing-rollers, substantially as specified.

8. In a roller-bearing, the combination of a hub-shell having internal annular flanges, an internal sleeve having peripheral flanges, bearing-rings having conical recesses terminating in horizontally-disposed bores, tie-rods uniting the bearing-rings, bearing-rollers having recessed ends fitted with tapering mandrels terminating in abruptly-conical ends journaled in the conical recesses, antifriction-sleeves contained in the hub-shell encircling and contacting the bearing-rollers, antifriction-sleeves mounted on the internal sleeve encircled by and contacting the bearing-rollers, and nuts fitted on the internal sleeve and into the ends of the hub-shell having on their inner faces annular flanges contacting with the ends of the bearing-rollers.

9. The combination of a hub-shell having internal annular flanges, an internal sleeve having peripheral flanges, bearing-rings, tie-rods for uniting the bearing-rings, bearing-rollers journaled in the bearing-rings, antifriction-sleeves contained within the hub-shell encircling and contacting the bearing-rollers, antifriction-sleeves mounted on the internal sleeve encircled by and contacting the bearing-rings, and nuts fitted on the internal sleeve and into the ends of the hub-shell having on their inner faces annular flanges contacting with the ends of the bearing-rollers.

10. The combination of the hub-shell having internal annular flanges, an internal sleeve having peripheral flanges, bearing-rings, tie-rods for uniting the bearing-rings, bearing-rollers journaled in the bearing-rings, antifriction-sleeves contained within the hub-shell encircling and contacting the bearing-rollers, separable abutting rings encircling the internal sleeve and prevented from inward displacement by the peripheral flanges, and antifriction-sleeves mounted on the internal sleeve prevented from inward displacement by the abutting rings, substantially as specified.

Toronto, July 12, 1901.

A. E. HENDERSON.

In presence of—
C. H. RICHES,
J. O'KEEFE.